(12) United States Patent
Thickey

(10) Patent No.: US 9,241,496 B2
(45) Date of Patent: Jan. 26, 2016

(54) GAME TRANSPORT DEVICE

(76) Inventor: Lester Thickey, Tarentum, PA (US)

( * ) Notice: Subject to any disclaimer, the term of this patent is extended or adjusted under 35 U.S.C. 154(b) by 180 days.

(21) Appl. No.: 13/586,200

(22) Filed: Aug. 15, 2012

(65) Prior Publication Data

US 2014/0051343 A1    Feb. 20, 2014

(51) Int. Cl.
*A22B 5/00* (2006.01)

(52) U.S. Cl.
CPC ........................................ *A22B 5/00* (2013.01)

(58) Field of Classification Search
CPC .......... A22B 5/00; A22B 5/0047; A22C 17/00
USPC ........................................................ 452/187
See application file for complete search history.

(56) References Cited

U.S. PATENT DOCUMENTS

| | | | | | |
|---|---|---|---|---|---|
| 4,196,889 | A | * | 4/1980 | Dudek | 254/344 |
| 4,531,686 | A | * | 7/1985 | Shaw | 242/404.3 |
| 4,754,825 | A | * | 7/1988 | Scheffer | 180/7.5 |
| 4,762,239 | A | * | 8/1988 | Wissman et al. | 212/179 |
| 4,884,784 | A | * | 12/1989 | Nix et al. | 254/362 |
| 5,336,124 | A | * | 8/1994 | Garside | 452/125 |
| 5,607,143 | A | * | 3/1997 | Regal | 254/342 |
| 6,027,154 | A | * | 2/2000 | Costa | 294/82.21 |
| 6,241,215 | B1 | * | 6/2001 | Gersemsky et al. | 254/342 |
| 7,201,552 | B1 | * | 4/2007 | Angel et al. | 414/462 |
| 7,543,798 | B2 | * | 6/2009 | Cunningham | 254/266 |
| 7,618,223 | B1 | * | 11/2009 | Begley | 414/139.4 |
| 7,913,978 | B1 | * | 3/2011 | Trihey et al. | 254/323 |
| 8,006,958 | B2 | * | 8/2011 | Starks et al. | 254/323 |
| 8,056,884 | B2 | * | 11/2011 | LaFreniere | 254/376 |
| 8,256,745 | B2 | * | 9/2012 | Latoria | 254/346 |
| 8,286,281 | B1 | * | 10/2012 | Toothman | 5/81.1 R |

* cited by examiner

*Primary Examiner* — Richard Price, Jr.

(57) ABSTRACT

The present invention is a game transport device that includes a securing strap that goes around a stable object, a battery casing that houses an approximate 24 Volt DC, 2 battery pack, a hoist casing that houses a hoist that is used to selectively perform one of pulling and dragging a large killed game animal and a wire pulling rope attached to the hoist. The game transport device also includes a swiveling hook attached to the wire pulling rope, where the swiveling hook is placed around the large killed game animal to releasably secure the large killed game animal, a carrying bag that contains and transports the game transport device and a remote control in communication with the hoist, the remote control includes a neutral button, a forward button, a stop button, an activation switch and a reset switch.

1 Claim, 2 Drawing Sheets

GAME TRANSPORT DEVICE

TECHNICAL FIELD & BACKGROUND

Currently there are limited options for a remote apparatus capable of assisting hunters with transporting their kill. Often, when successful at hunting a large animal, a hunter finds it difficult to return to their vehicle and/or lodge while carrying the killed game animal, especially relatively large killed game animals.

The present invention generally relates to a transport device. More specifically, the invention is a game transport device.

It is an object of the invention to provide a game transport device that is utilized to transport a killed game animal such as a deer, an elk, a moose, a bear or other relatively large killed game animal.

It is an object of the invention to provide a game transport device that is utilized to load a relatively large killed game animal on a truck, a trailer or other suitable vehicle or platform.

It is an object of the invention to provide a game transport device that can lift a relatively large game animal to enable a hunter to cut, clean and skin the relatively large game animal.

What is really needed is a game transport device that is utilized to transport a killed game animal such as a deer, an elk, a moose, a bear or other relatively large killed game animal, that is utilized to load a relatively large killed game animal on a truck, a trailer or other suitable vehicle or platform and that can lift a relatively large game animal to enable a hunter to cut, clean and skin the relatively large game animal.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention. However, the order of description should not be construed as to imply that these operations are necessarily order dependent. In particular, these operations need not be performed in the order of presentation.

The phrase "in one embodiment" is utilized repeatedly. The phrase generally does not refer to the same embodiment, however, it may. The terms "comprising", "having" and "including" are synonymous, unless the context dictates otherwise.

Figure 1A:
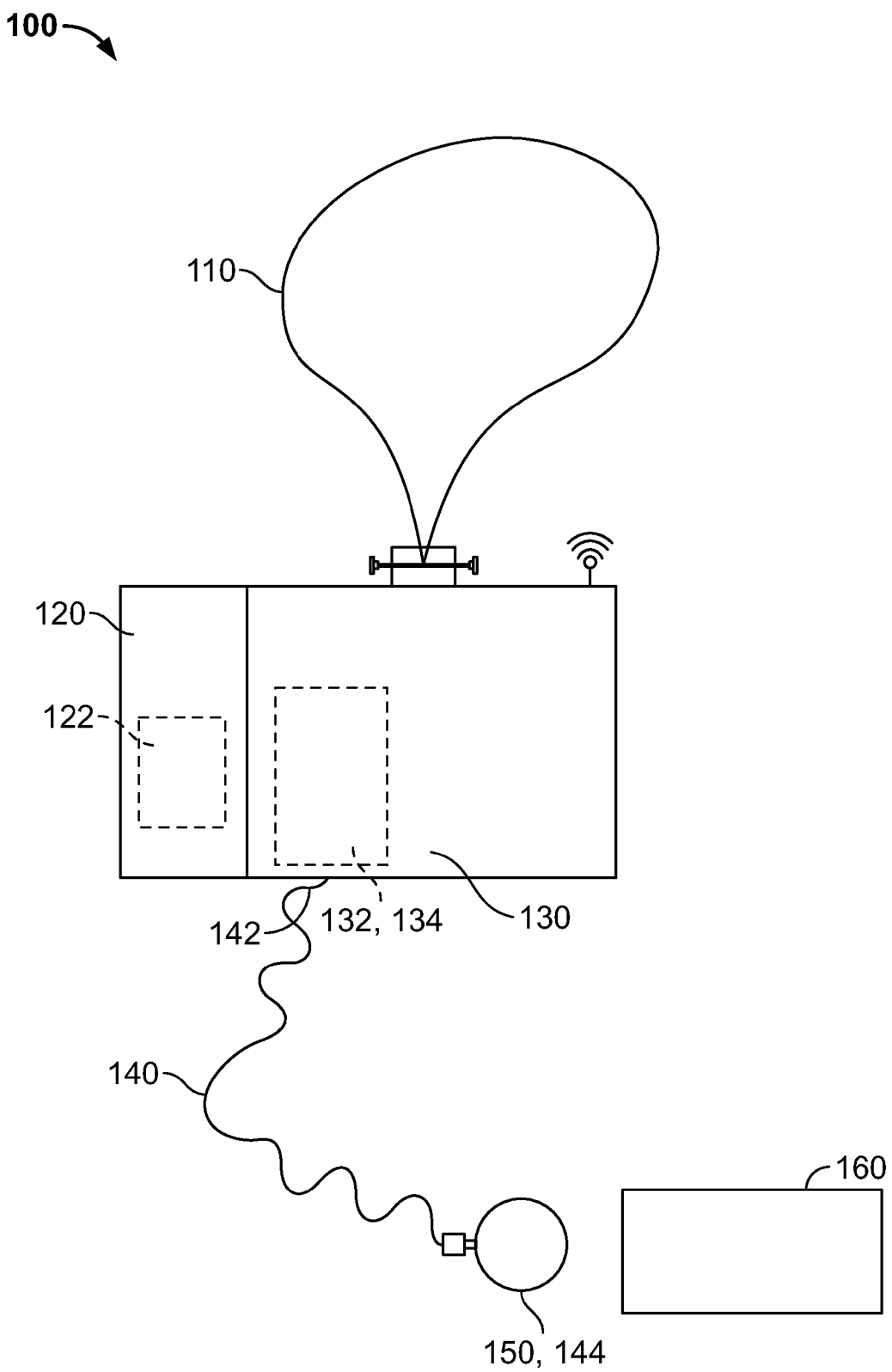
FIG. 1A illustrates a front view of a game transport device, according to an embodiment of the present invention.

FIG. 1A illustrates a front view of a game transport device 100, according to an embodiment of the present invention. The game transport device 100 is utilized to transport or drag a killed game animal such as a deer, an elk, a moose, a bear or other suitable relatively large killed game animal, and is utilized to load a suitable relatively large killed game animal on a truck, a trailer or other suitable vehicle or platform and can lift a suitable relatively large game animal to enable a hunter to cut, clean and skin the relatively large game animal.

The game transport device 100 includes a securing strap 110, a battery casing 120, a hoist casing 130, a wire pulling rope 140, a swiveling hook 150 and a carrying bag 160. The securing strap 110 goes around a tree or other suitable stable object and is made of heavy duty nylon or other suitable material. The battery casing 120 houses an approximate 24 Volt DC, 2 battery pack 122, although the approximate 24 Volt DC, 2 battery pack 122 can be one or more batteries or battery packs and other suitable voltage such as 12 Volts or more. The hoist casing 130 houses a hoist 132 that is used to pull, drag or lift the relatively large killed game animal. The battery casing 120 is adjacent to the hoist casing 130 and both the battery casing 120 and the hoist casing 130 are made of metal such as aluminum, steel or any other suitable metal. The hoist 132 is an electric hoist 134 that is powered by the approximate 24 Volt DC, 2 battery pack 122, although any other suitable hoist can be utilized with the game transport device 100. The hoist 132 is able to pull in the approximate range of 700 pounds to 1,000 pounds but can pull any other suitable quantity of weight such as less than 700 pounds. The hoist 132 is free-spooling when in neutral and has one speed, but can have a plurality of speeds as well.

The wire pulling rope 140 has a first end 142 and a second end 144. The first end 142 of the wire pulling rope 140 is attached to the hoist 132 and is utilized to transport or lift a relatively large killed game animal. The wire pulling rope 140 is in the approximate range of 30 feet to 40 feet in length, but can be any other suitable length such as greater than approximately 40 feet in length. The wire pulling rope 140 is pulled inward by the hoist 132 to pull a relatively large killed game animal without having to manually drag the relatively large killed game animal. The swiveling hook 150 is attached to the second end 144 of the wire pulling rope 140 and is placed around the relatively large killed game animal to releasably secure the relatively large killed game animal to the second end 144 of the wire pulling rope 140 to enable the hoist 132 and wire pulling rope 140 to transport or lift the relatively large killed game animal. More specifically, the swiveling hook 150 is intended to be placed around the front shoulder region of the relatively large killed game animal or other suitable region of the relatively large killed game animal. The carrying bag 160 contains and transports the securing strap 110, the battery casing 120, the hoist casing 130, the wire pulling rope 140 and the swiveling hook 150. The carrying bag 160 can also be placed underneath the relatively large killed game animal to assist and facilitate dragging the relatively large killed game animal along a ground surface (not shown) such as rough terrain, up a hill or any other suitable ground surface as well as relatively smooth surfaces. The carrying bag 160 is made of nylon but can be made of any suitable material.

Figure 1B:
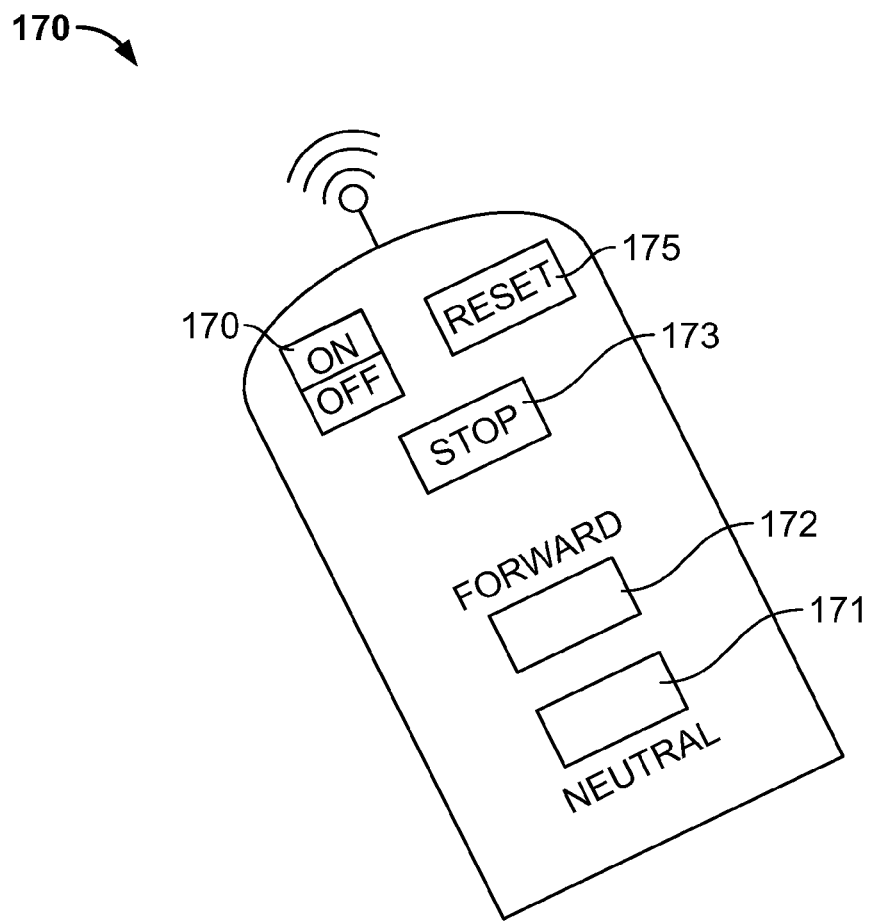
FIG. 1B illustrates a front view of a remote control of a game transport device, according to an embodiment of the present invention.

FIG. 1B illustrates a front view of a remote control 170 of a game transport device 100, according to an embodiment of the present invention.

The remote control 170 is in communication with the hoist 132 and controls a plurality of operations of the hoist 132. The remote control 170 can utilize radio technology, ultrasonic technology, laser technology, infrared technology or any other suitable technology to communicate with the hoist 132. The remote control 170 includes a neutral button 171, a forward button 172, a stop button 173, an activation switch 174 and a reset switch 175. The neutral button 171 puts the hoist 132 in a neutral state which allows the hoist 132 to free spool. The forward button 172 moves the wire pulling rope 140 and the swiveling hook 150 inward pulling the relatively large killed game animal secured by the swiveling hook 150 towards the hoist 132. The stop button 173 stops the hoist 132 after it has been activated by the forward button 172. The activation switch 174 is a toggle switch 176 that can activate and shut down the hoist 132. The reset switch 175 resets the hoist 132 after use.

The game transport device is a transporting and lugging mechanism that introduces a relatively effective and non-strenuous method for pulling a wild game animal carcass. Made from relatively sturdy materials, such as metal, aluminum, and steel, the game transport device includes an approximate 24V DC battery powered central unit that utilizes a nylon strap, intended to be wrapped around a tree and an opposing wire rope in the approximate range of 30 feet to 40 feet designed with a swivel hook intended to be placed around the front shoulder region of a killed game animal. Controlled by a hoist system and hand held remote control, the user can simply control the movement of the wire rope as the internal motor, able to pull approximately in the range of 700 to 1000 lbs., drags the killed game animal to a central unit and relatively effectively transport the killed game animal up a hill, out of a deep valley or any other suitable relatively challenging landscape. The game transport device may be readily available at well-known outdoor and recreational hunting retailers. The game transport device utilizes an adjustable tripod lifting system and a relatively heavy duty gambrel that enables a hunter to lift the killed game animal and direct its placement into the back of a truck or other suitable vehicle with relative ease. The feature of complimenting a remote control and a pair of carrying and lifting apparatuses provides a hunter with a well suited device for minimizing physical exertion when transporting or skinning a killed game animal.

While the present invention has been related in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

The invention claimed is:

1. A game transport device, comprising:
a hoist casing that houses a hoist that is operative to selectively perform one of pulling and dragging a large killed game animal, wherein said hoist includes at least one operation speed and a neutral setting;
a securing strap connected to said hoist casing, wherein said securing strap is configured to be secured to a stable object;
a power source integral with said hoist, wherein said power source supplies electricity to said hoist;
an elongated wire pulling rope with a first end and a second end, wherein said first end of said wire pulling rope is attached to said hoist and said wire pulling rope is free spooling when said hoist is in neutral;
a swiveling hook attached to said second end of said wire pulling rope, wherein said swiveling hook is operative to releasably secure a large killed game animal to said second end of said wire pulling rope;
a carrying bag adapted to house said securing strap, hoist casing, wire pulling rope and swiveling hook, wherein said carrying bag is constructed of a durable and pliable material such that it is adapted to be placed underneath a large killed game animal while being dragged; and
a remote control in communication with said hoist, wherein said remote control controls said hoist and includes a neutral button, a forward button, a stop button, an activation switch and a reset switch.

\* \* \* \* \*